(12) United States Patent
Liu

(10) Patent No.: US 9,653,857 B1
(45) Date of Patent: May 16, 2017

(54) ELECTRONIC DEVICE AND LOOSE-PROOF MODULE

(71) Applicant: Wistron Corporation, New Taipei (TW)

(72) Inventor: Chia-Hsin Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/344,587

(22) Filed: Nov. 7, 2016

(30) Foreign Application Priority Data

Aug. 15, 2016 (TW) .............................. 105125884 A

(51) Int. Cl.
| H01R 13/66 | (2006.01) |
| H01R 13/73 | (2006.01) |
| G06F 1/18 | (2006.01) |

(52) U.S. Cl.
CPC ............. *H01R 13/73* (2013.01); *G06F 1/182* (2013.01)

(58) Field of Classification Search
CPC ..................................................... H01R 13/743
USPC ................... 439/555, 557; 248/27.3
See application file for complete search history.

(56) References Cited

U.S. PATENT DOCUMENTS

| 3,430,188 | A | * | 2/1969 | Leach ................... | H01R 13/743 |
| | | | | | 248/27.3 |
| 5,389,015 | A | * | 2/1995 | Sasai ..................... | H01R 13/743 |
| | | | | | 439/555 |
| 5,588,858 | A | * | 12/1996 | Lester ................... | H01R 13/743 |
| | | | | | 439/275 |
| 5,613,876 | A | * | 3/1997 | Sakatani ................. | B60R 16/02 |
| | | | | | 296/146.5 |
| 5,692,923 | A | * | 12/1997 | Sawada .............. | H01R 13/6272 |
| | | | | | 439/350 |
| 6,361,362 | B1 | * | 3/2002 | Kressmann .......... | H01R 13/743 |
| | | | | | 439/157 |
| 6,860,759 | B2 | * | 3/2005 | Nakamura ........... | H01R 13/745 |
| | | | | | 439/557 |
| 7,513,794 | B2 | * | 4/2009 | Lange .................. | H01R 13/745 |
| | | | | | 439/555 |

* cited by examiner

*Primary Examiner* — Neil Abrams
(74) *Attorney, Agent, or Firm* — Winston Hsu; Scott Margo

(57) ABSTRACT

A loose-proof module is used for fixing a connector, wherein the connector has two engaging hooks and a deformation space exists between each engaging hook and a side wall of the connector. The loose-proof module includes a support frame and a fixing member. The support frame has a fixing hole, a first through hole and a first engaging portion. The first engaging portion extends from a bottom surface of the support frame and is adjacent to the first through hole. The fixing member has a second engaging portion and two stop portions. When the connector is inserted into the fixing hole, the engaging hooks are engaged with a top surface of the support frame. When the second engaging portion is inserted into the first through hole, the second engaging portion is engaged with the first engaging portion and each stop portion is sandwiched in the deformation space correspondingly.

16 Claims, 10 Drawing Sheets

US 9,653,857 B1

ELECTRONIC DEVICE AND LOOSE-PROOF MODULE

BACKGROUND OF THE INVENTION

1. Field of the Invention

The invention relates to an electronic device and a loose-proof module and, more particularly, to a loose-proof module capable of preventing a connector from loosing effectively and an electronic device equipped with the loose-proof module.

2. Description of the Prior Art

As technology advances and develops, various electronic devices (e.g. computer, server and so on) are considered a necessity by a lot of people in their daily lives. To provide various functions for the electronic devices, the electronic devices are always equipped with various electronic components, so as to enhance additional functions. In general, one electronic component is electrically connected to another electronic component by connectors. Take the connection between a fan and a power supply for example, the prior art fixes a connector of the power supply on a casing by engaging hooks and then inserts a connector of the fan into the connector of the power supply, so as to form electrical connection. However, when inserting the connector of the fan into the connector of the power supply, the connector of the power supply often looses from the casing if the inserting force is too large. Accordingly, it will interfere with the assembly process.

SUMMARY OF THE INVENTION

The invention provides a loose-proof module capable of preventing a connector from loosing effectively and an electronic device equipped with the loose-proof module, so as to solve the aforesaid problems.

According to an embodiment of the invention, a loose-proof module is used for fixing a connector, wherein the connector has two engaging hooks and a deformation space exists between each of the engaging hooks and a side wall of the connector. The loose-proof module comprises a support frame and a fixing member. The support frame has a fixing hole, a first through hole and a first engaging portion, wherein the first engaging portion extends from a bottom surface of the support frame and is adjacent to the first through hole. The fixing member has a second engaging portion and two stop portions. When the connector is inserted into the fixing hole, the engaging hooks are engaged with a top surface of the support frame. When the second engaging portion of the fixing member is inserted into the first through hole, the second engaging portion is engaged with the first engaging portion and each of the stop portions is sandwiched in the deformation space correspondingly.

According to another embodiment of the invention, an electronic device comprises a casing, an electronic component, a connector and a loose-proof module. The electronic component is disposed in the casing. The connector has two engaging hooks and a deformation space exists between each of the engaging hooks and a side wall of the connector. The loose-proof module is disposed on the casing. The loose-proof module comprises a support frame and a fixing member. The support frame has a fixing hole, a first through hole and a first engaging portion, wherein the first engaging portion extends from a bottom surface of the support frame and is adjacent to the first through hole. The fixing member has a second engaging portion and two stop portions. When the connector is inserted into the fixing hole, the engaging hooks are engaged with a top surface of the support frame. When the second engaging portion of the fixing member is inserted into the first through hole, the second engaging portion is engaged with the first engaging portion and each of the stop portions is sandwiched in the deformation space correspondingly.

As mentioned in the above, when the connector is inserted into the fixing hole of the support frame, a user can insert the engaging portion of the fixing member into the through hole of the support frame, such that the stop portion of the fixing member is sandwiched in the deformation space between the engaging hook and the side wall of the connector. Since the stop portion of the fixing member stops the engaging hook from deforming elastically toward the side wall of the connector, the connector will not loose from the fixing hole of the support frame when the connector is pressed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
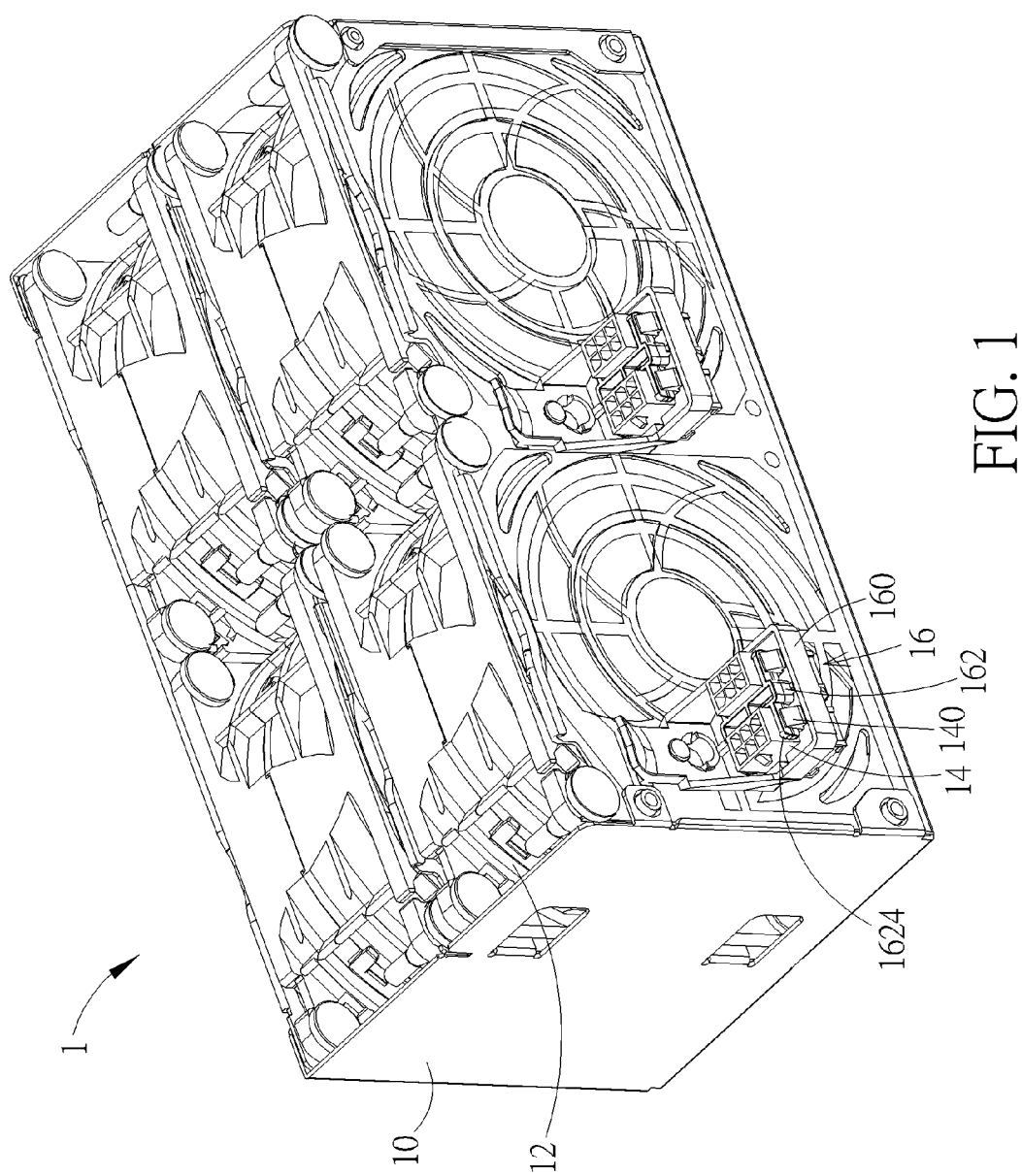
FIG. 1 is a perspective view illustrating an electronic device according to an embodiment of the invention.
Figure 2:
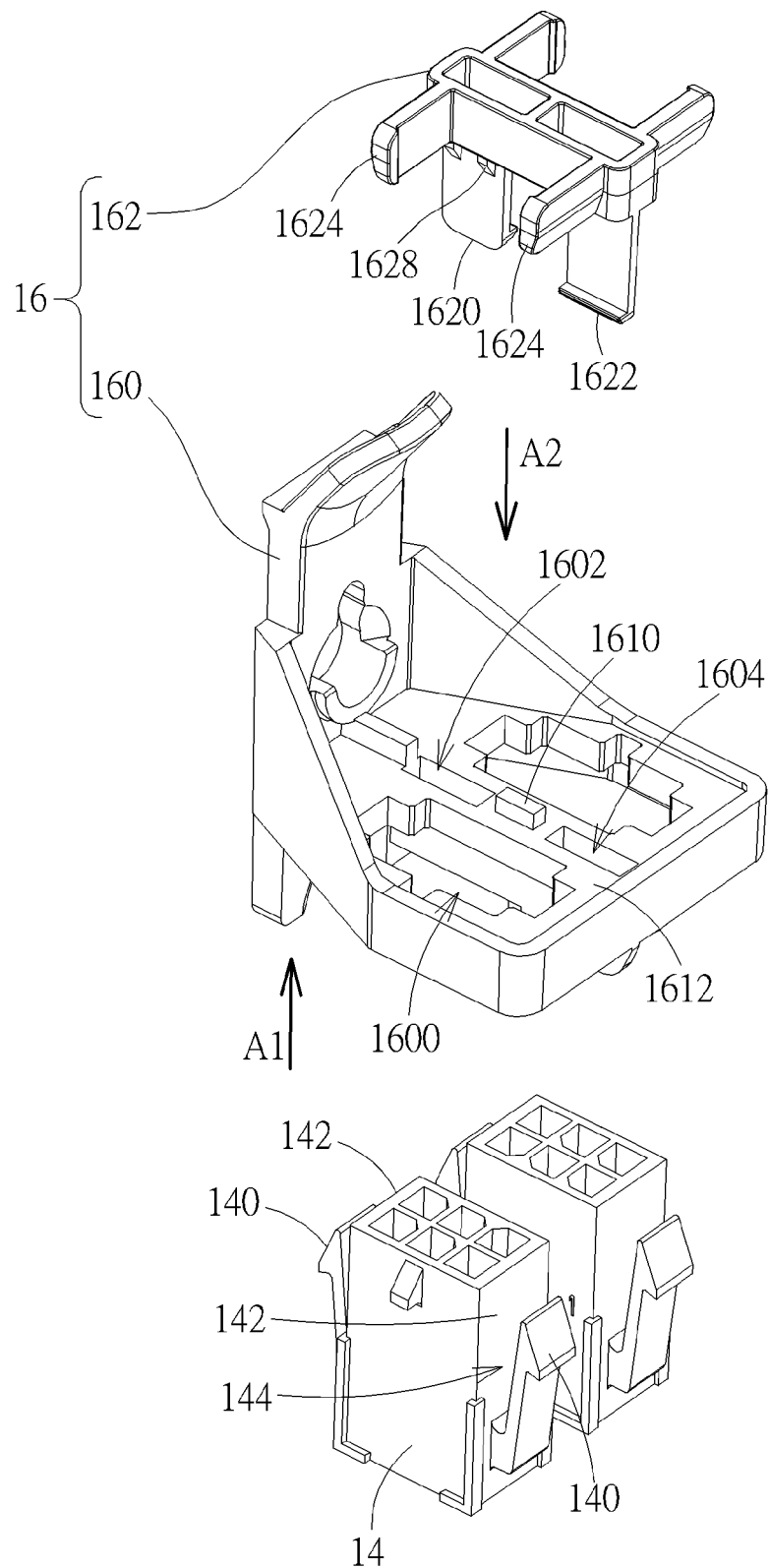
FIG. 2 is an exploded view illustrating the connector and the loose-proof module shown in FIG. 1.
Figure 3:
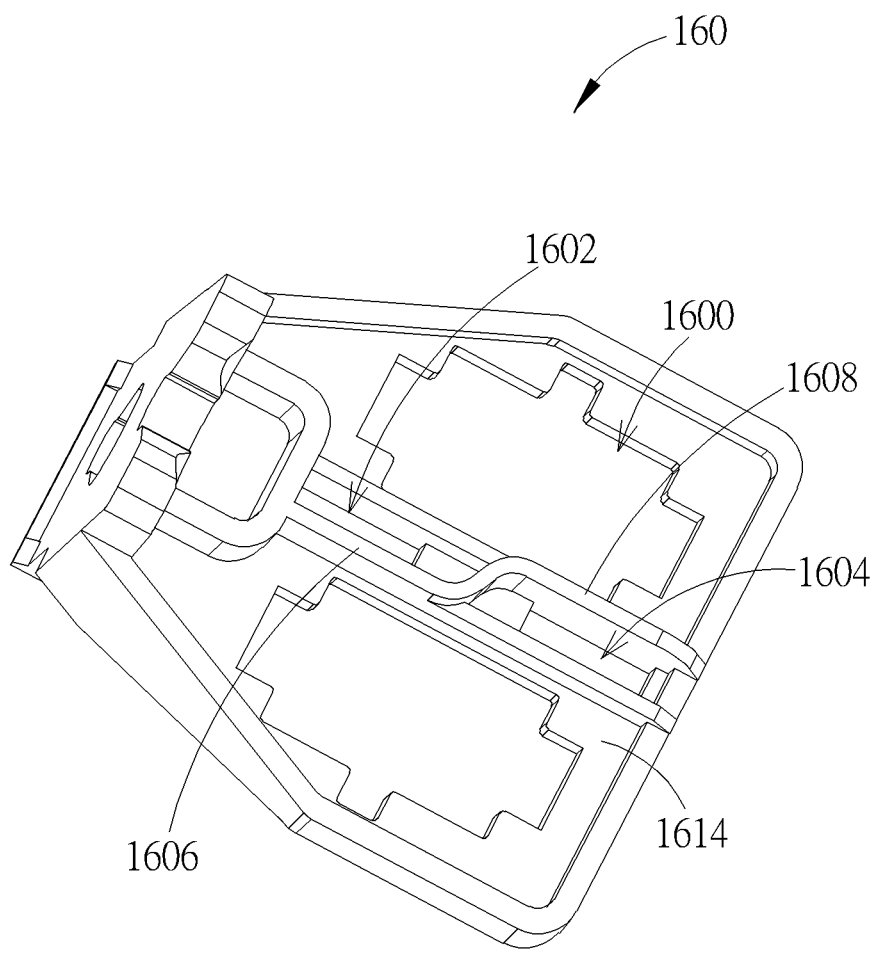
FIG. 3 is a perspective view illustrating the support frame shown in FIG. 2 from another viewing angle.
Figure 4:
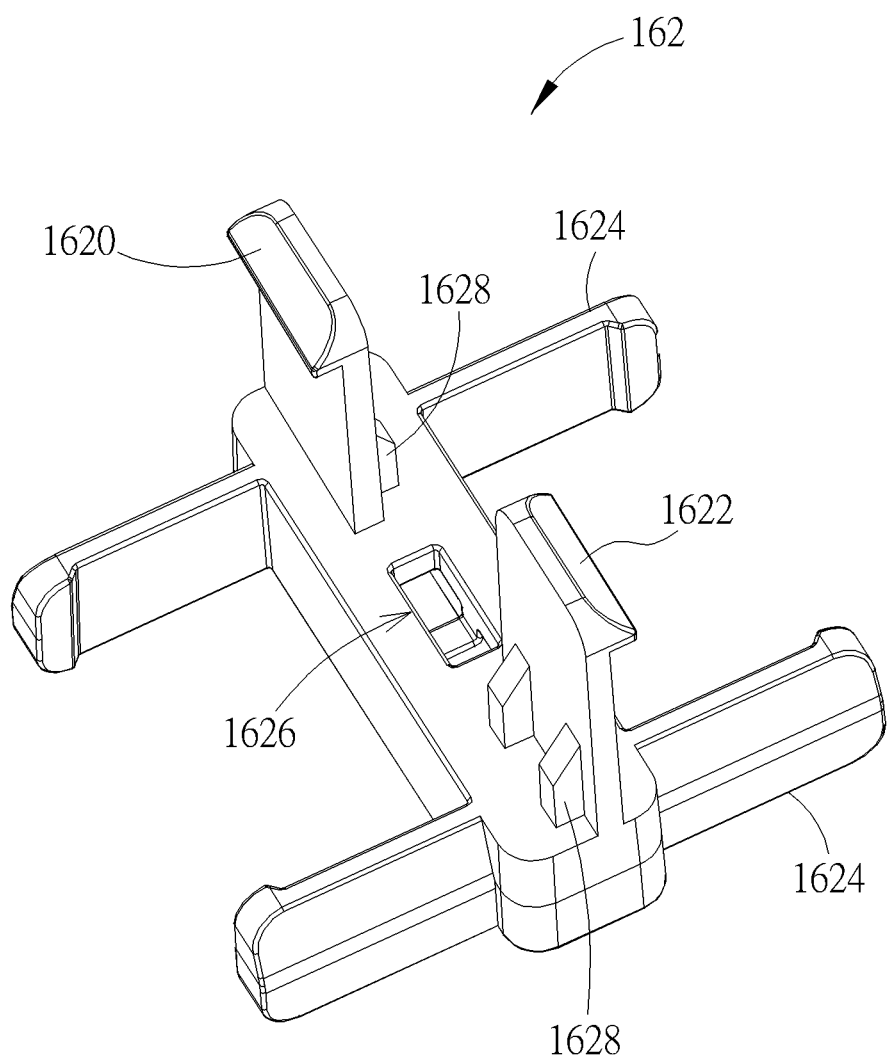
FIG. 4 is a perspective view illustrating the fixing member shown in FIG. 2 from another viewing angle.
Figure 5:
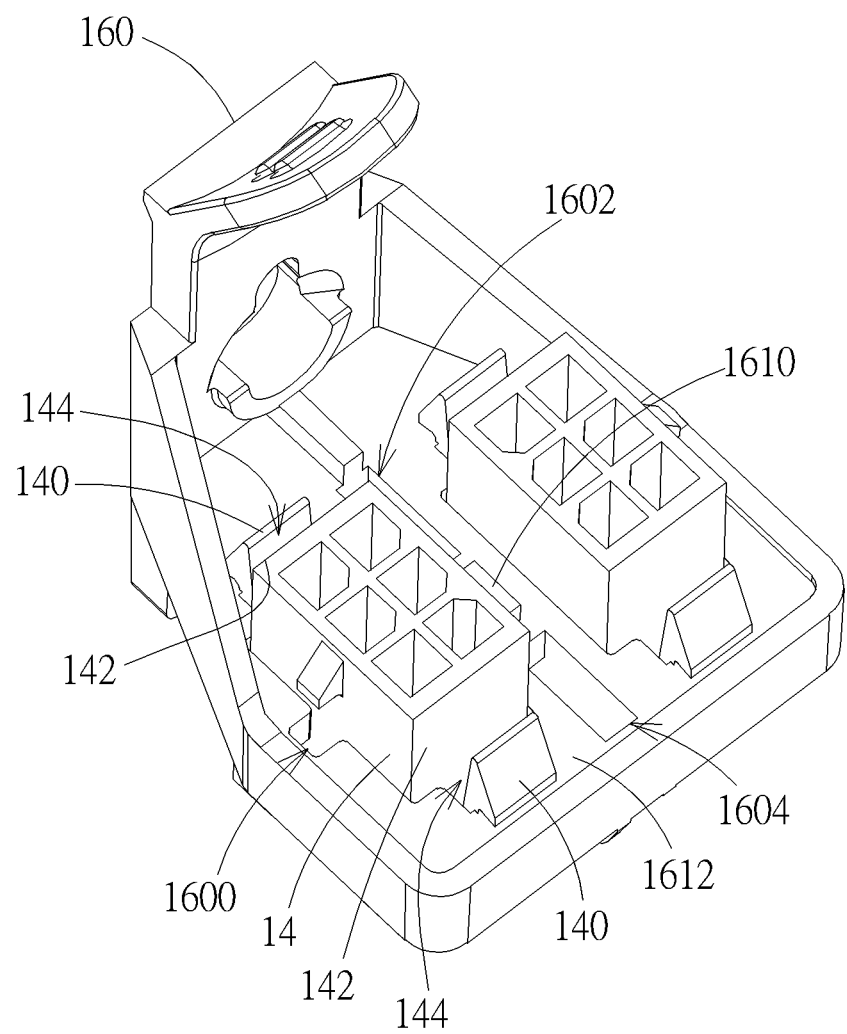
FIG. 5 is an assembly view illustrating the connector and the support frame shown in FIG. 2.
Figure 6:
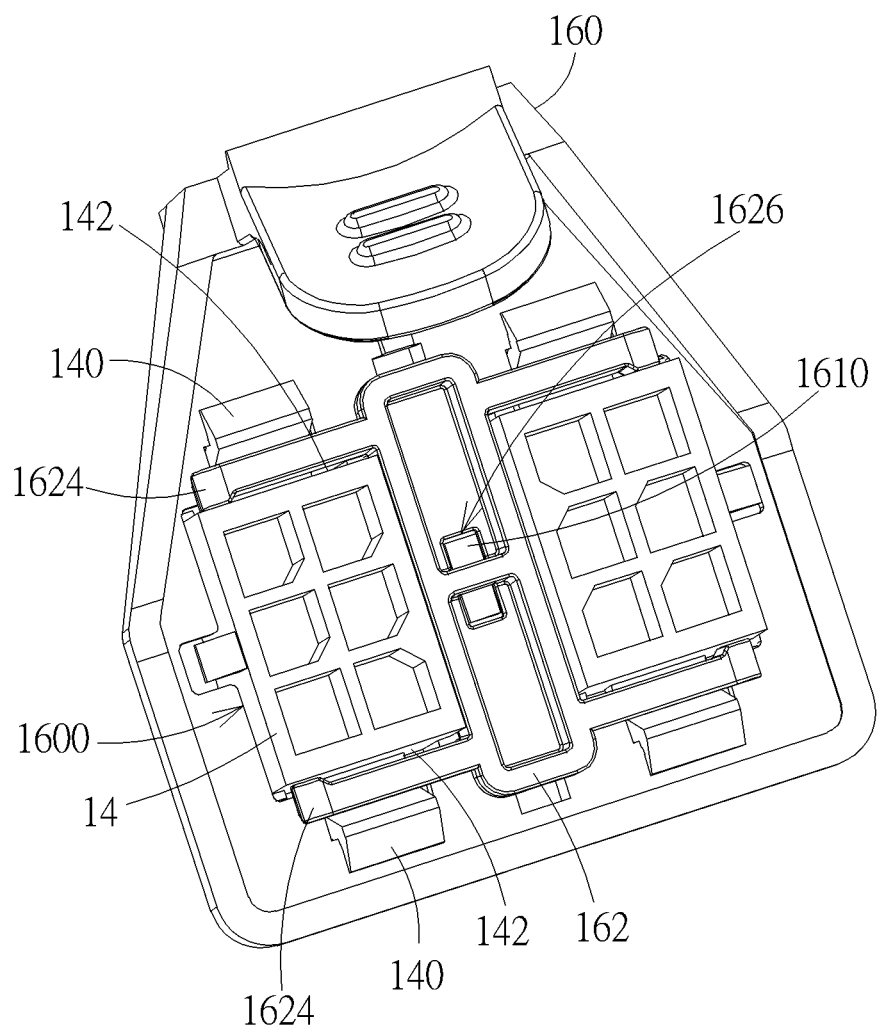
FIG. 6 is an assembly view illustrating the connector and the loose-proof module shown in FIG. 2.
Figure 7:
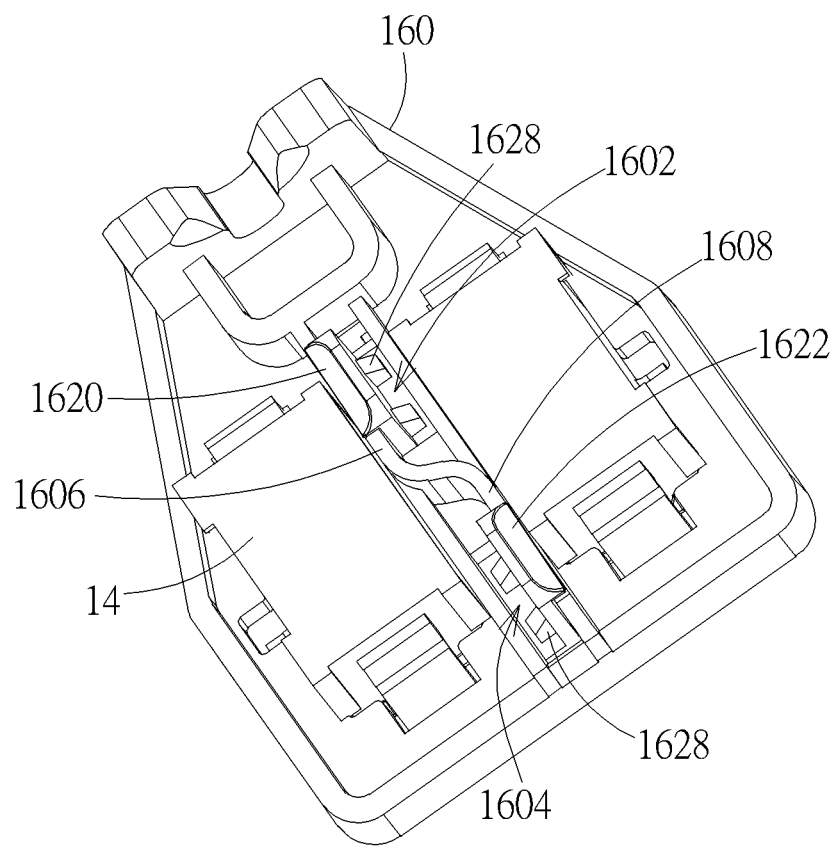
FIG. 7 is an assembly view illustrating the connector and the loose-proof module shown in FIG. 6 from another viewing angle.

Referring to FIGS. 1 to 7, FIG. 1 is a perspective view illustrating an electronic device 1 according to an embodiment of the invention, FIG. 2 is an exploded view illustrating the connector 14 and the loose-proof module 16 shown in FIG. 1, FIG. 3 is a perspective view illustrating the support frame 160 shown in FIG. 2 from another viewing angle, FIG. 4 is a perspective view illustrating the fixing member 162 shown in FIG. 2 from another viewing angle, FIG. 5 is an assembly view illustrating the connector 14 and the support frame 160 shown in FIG. 2, FIG. 6 is an assembly view illustrating the connector 14 and the loose-proof module 16 shown in FIG. 2, and FIG. 7 is an assembly view illustrating the connector 14 and the loose-proof module 16 shown in FIG. 6 from another viewing angle.

As shown in FIG. 1, the electronic device 1 comprises a casing 10, four electronic components 12, four connectors 14 and two loose-proof modules 16. In this embodiment, the electronic device 1 may be, but not limited to, a fan assembly and the electronic component 12 may be, but not limited to, a fan. In practical applications, the electronic device 1 may be disposed in a computer, a server or other electronic devices and the electronic component 12 may be an electronic component of the computer, the server or other electronic devices. Furthermore, the connector 14 may be a connector of a power supply (not shown) or other electronic components. It should be noted that the number of the electronic components 12, the connectors 14 and the loose-proof modules 16 may be determined according to practical applications, so those are not limited to the embodiment shown in FIG. 1.

The electronic component 12 is disposed in the casing 10 and the loose-proof module 16 is disposed on the casing 10. The loose-proof module 16 is used for fixing the connector 14. As shown in FIG. 2, the connector 14 has two engaging hooks 140 and a deformation space 144 exists between each of the engaging hooks 140 and a side wall 142 of the connector 14. In other words, when the engaging hook 140 is pressed toward the side wall 142, the deformation space 144 allows the engaging hook 140 to deform elastically toward the side wall 142.

The loose-proof module 16 comprises a support frame 160 and a fixing member 162. In this embodiment, the support frame 160 and the fixing member 162 may be made of plastic by an injection molding process. As shown in FIGS. 2 and 3, the support frame 160 has two fixing holes 1600, a first through hole 1602, a second through hole 1604, a first engaging portion 1606, a third engaging portion 1608 and a first positioning portion 1610. The connector 14 is fixed in the fixing hole 1600 of the support frame 160. In this embodiment, two fixing holes 1600 of the support frame 160 are used for fixing two connectors 14. In another embodiment, the support frame 160 may has one single fixing hole 1600 for fixing one single connector 14.

As shown in FIGS. 2 and 3, the first positioning portion 1610 may be a protrusion protruded from a top surface 1612 of the support frame 160 and located between the first through hole 1602 and the second through hole 1604. The first engaging portion 1606 extends from a bottom surface 1614 of the support frame 160 and is adjacent to the first through hole 1602. The third engaging portion 1608 extends from the bottom surface 1614 of the support frame 160 and is adjacent to the second through hole 1604. In this embodiment, the first engaging portion 1606 and the third engaging portion 1608 may be a side wall extending from the bottom surface 1614 of the support frame 160 and may be connected to each other integrally. In another embodiment, the first engaging portion 1606 and the third engaging portion 1608 may be independent side walls.

As shown in FIGS. 2 and 4, the fixing member 162 has a second engaging portion 1620, a fourth engaging portion 1622, four stop portions 1624, a second positioning portion 1626 and a plurality of reinforcing ribs 1628. In this embodiment, an extending direction of the second engaging portion 1620 is perpendicular to an extending direction of the stop portions 1624 and an extending portion of the fourth engaging portion 1622 is parallel to the extending direction of the second engaging portion 1620. In other words, the extending portion of the fourth engaging portion 1622 is also perpendicular to the extending direction of the stop portions 1624. Four stop portions 1624 are distributed around the fixing member 162 symmetrically. The reinforcing ribs 1628 are connected to the second engaging portion 1620 and the fourth engaging portion 1622, so as to reinforce structural stiffness of the second engaging portion 1620 and the fourth engaging portion 1622.

In this embodiment, the second engaging portion 1620 and the fourth engaging portion 1622 may be designed as engaging hooks and face opposite directions. Furthermore, the second positioning portion 1626 may be a recess and located between the second engaging portion 1620 and the fourth engaging portion 1622.

In the following, FIGS. 2 and 5-7 are used for describing the assembly process of the loose-proof module 16 and the connector 14 of the invention. First of all, a user may insert the connector 14 into the fixing hole 1600 of the support frame 160 in a direction indicated by an arrow A1 shown in FIG. 2. When the connector 14 is inserted into the fixing hole 1600 of the support frame 160, the engaging hooks 140 of the connector 14 are engaged with the top surface 1612 of the support frame 160, as shown in FIG. 5. Afterward, the user may insert the second engaging portion 1620 and the fourth engaging portion 1622 of the fixing member 162 into the first through hole 1602 and the second through hole 1604 of the support frame 160 in a direction indicated by an arrow A2 shown in FIG. 2. When the second engaging portion 1620 and the fourth engaging portion 1622 of the fixing member 162 are inserted into the first through hole 1602 and the second through hole 1604 of the support frame 160, respectively, each of the stop portions 1624 is sandwiched in the deformation space 144 correspondingly, as shown in FIG. 6.

Furthermore, when the second engaging portion 1620 and the fourth engaging portion 1622 of the fixing member 162 are inserted into the first through hole 1602 and the second through hole 1604 of the support frame 160, respectively, the second positioning portion 1626 of the fixing member 162 is engaged with the first positioning portion 1610 of the support frame 160, so as to fix the fixing member 162 with respect to the support frame 160, as shown in FIG. 6. Moreover, when the second engaging portion 1620 and the fourth engaging portion 1622 of the fixing member 162 are inserted into the first through hole 1602 and the second through hole 1604 of the support frame 160, respectively, the second engaging portion 1620 of the fixing member 162 is engaged with the first engaging portion 1606 of the support frame 160 and the fourth engaging portion 1622 of the fixing member 162 is engaged with the third engaging portion 1608 of the support frame 160, such that the fixing member 162 is fixed on the support frame 160, as shown in FIG. 7.

In this embodiment, since the second engaging portion 1620 and the fourth engaging portion 1622 face opposite directions, the fixing member 162 can be fixed on the support frame 160 more stably. It should be noted that if the fixing strength between the fixing member 162 and the support frame 160 is acceptable, the second engaging portion 1620 and the fourth engaging portion 1622 may face identical directions. When the second engaging portion 1620 and the fourth engaging portion 1622 face identical directions, the first engaging portion 1606 and the third engaging portion 1608 of the support frame 160 have to be located at identical side of the first through hole 1602 and the second through hole 1604. Still further, if the fixing strength between the fixing member 162 and the support frame 160 is acceptable, the invention may use one single second engaging portion 1620 to cooperate with one single first engaging portion 1606, so as to fix the fixing member 162 on the support frame 160.

Figure 8:
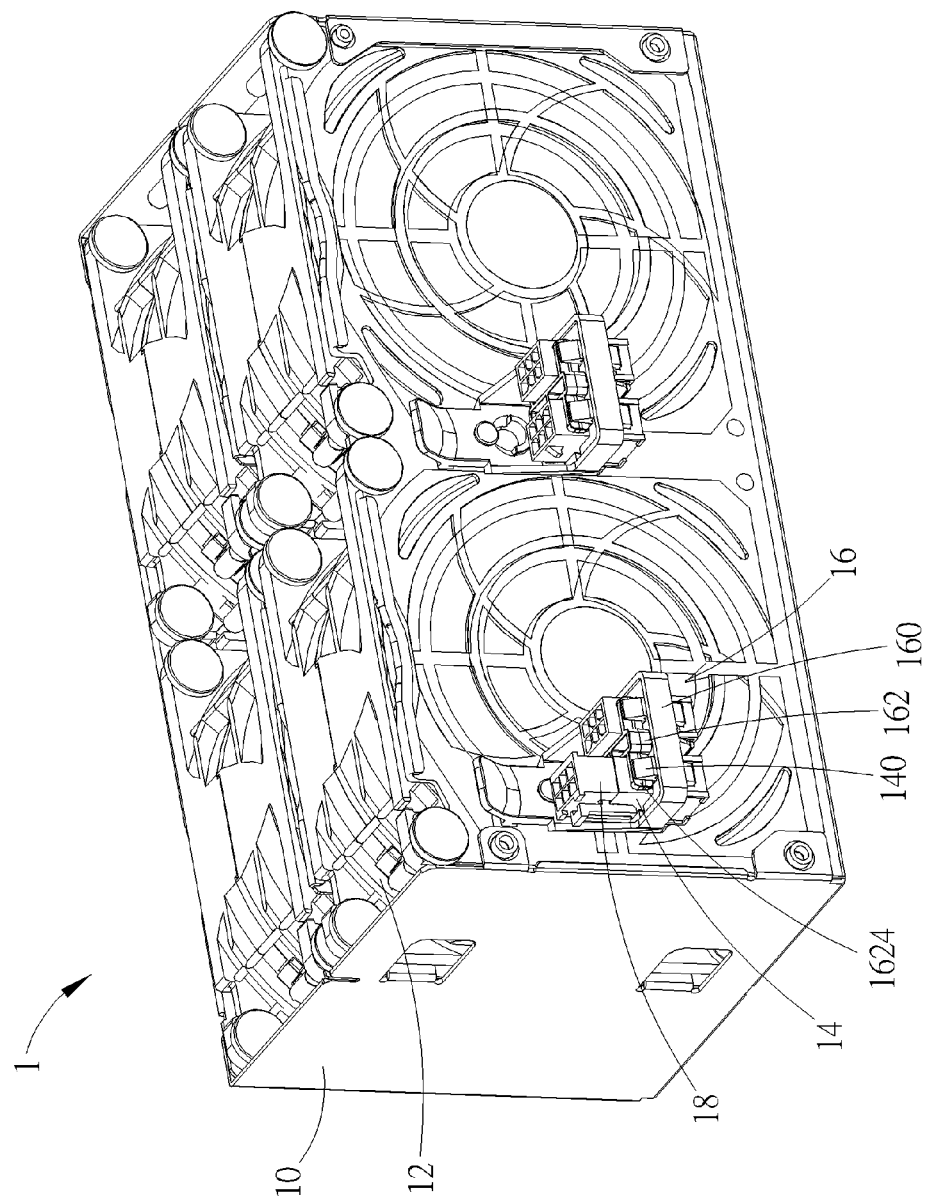
FIG. 8 is a perspective view illustrating a connector inserted into the connector shown in FIG. 1.

Referring to FIG. 8, FIG. 8 is a perspective view illustrating a connector 18 inserted into the connector 14 shown in FIG. 1. As shown in FIG. 8, the electronic component 12 may has a connector 18. In practical applications, the connector 18 may be connected to the electronic component 12 by a cable (not shown). After fixing the connector 14 on the loose-proof module 16 and disposing the loose-proof module 16 on the casing 10, the user may insert the connector 18 of the electronic component 12 into the connector 14. Since the stop portion 1624 of the fixing member 162 stops the engaging hook 140 of the connector 14 from deforming elastically toward the side wall 142 of the connector 14, the connector 14 will not loose from the fixing hole 1600 of the support frame 160 when the connector 14 is pressed.

Figure 9:
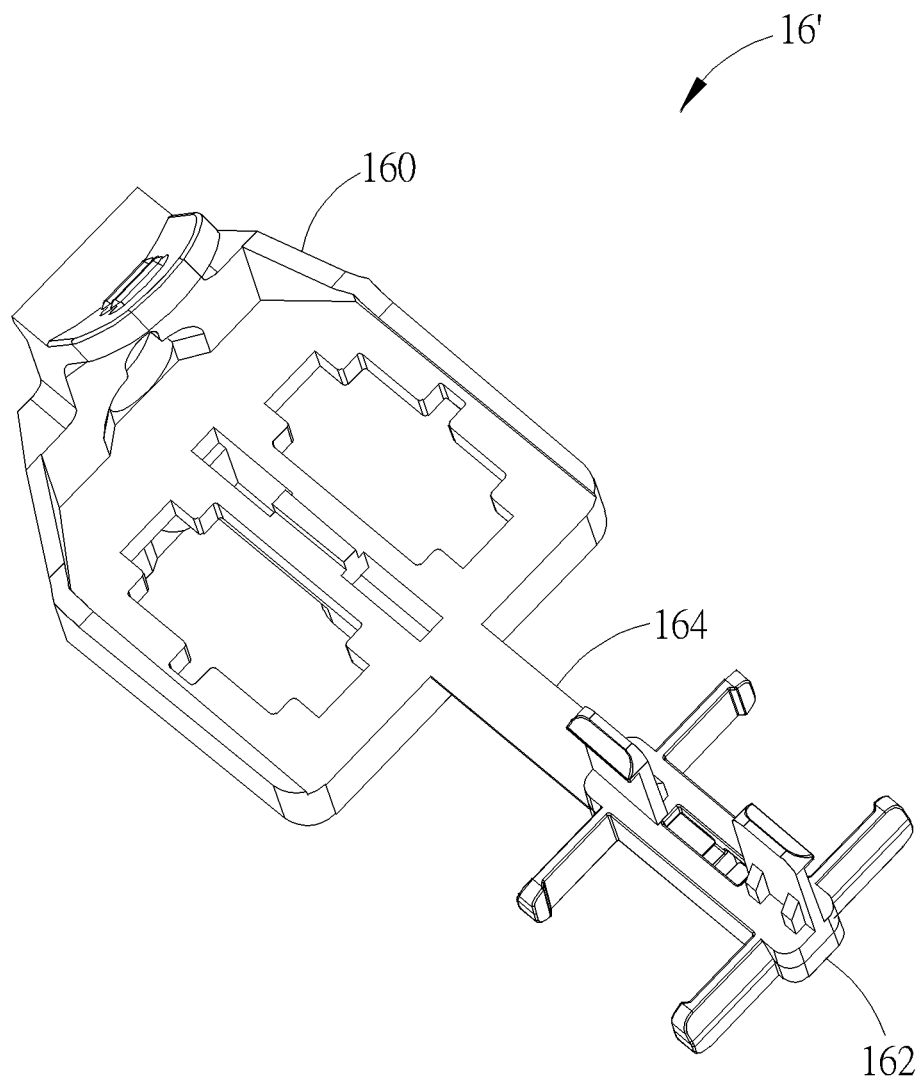
FIG. 9 is a perspective view illustrating a loose-proof module according to another embodiment of the invention.
Figure 10:
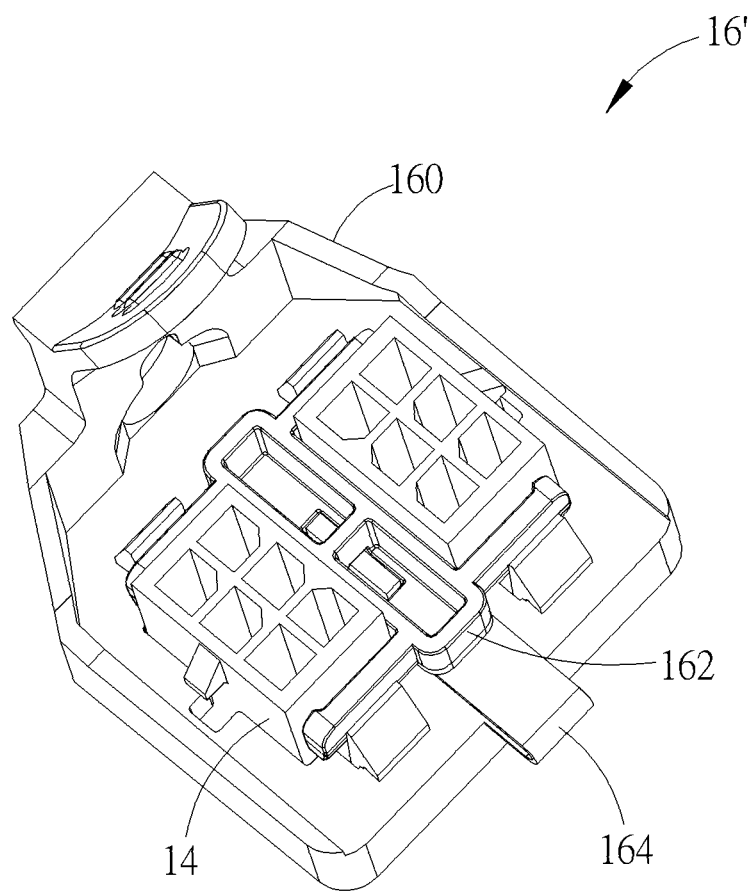
FIG. 10 is an assembly view illustrating the connector and the loose-proof module shown in FIG. 9.

Referring to FIGS. 9 and 10, FIG. 9 is a perspective view illustrating a loose-proof module 16' according to another embodiment of the invention and FIG. 10 is an assembly view illustrating the connector 14 and the loose-proof module 16' shown in FIG. 9. The main difference between the loose-proof module 16' and the aforesaid loose-proof module 16 is that the loose-proof module 16' further comprises a connecting member 164 connecting the support frame 160 and the fixing member 162, as shown in FIGS. 9 and 10. In this embodiment, the support frame 160, the fixing member 162 and the connecting member 164 may be made of plastic by an injection molding process and formed integrally. Since the support frame 160 and the fixing member 162 are connected to each other by the connecting member 164, the invention can prevent one of the support frame 160 and the fixing member 162 from being lost. Furthermore, the connecting member 164 is flexible, so the support frame 160 and the fixing member 162 may be expanded (as shown in FIG. 9) or folded (as shown in FIG. 10) by the connecting member 164.

As mentioned in the above, when the connector is inserted into the fixing hole of the support frame, a user can insert the engaging portion of the fixing member into the through hole of the support frame, such that the stop portion of the fixing member is sandwiched in the deformation space between the engaging hook and the side wall of the connector. Since the stop portion of the fixing member stops the engaging hook from deforming elastically toward the side wall of the connector, the connector will not loose from the fixing hole of the support frame when the connector is pressed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A loose-proof module for fixing a connector, the connector having two engaging hooks, a deformation space existing between each of the engaging hooks and a side wall of the connector, the loose-proof module comprising:
   a support frame having a fixing hole, a first through hole and a first engaging portion, the first engaging portion extending from a bottom surface of the support frame and being adjacent to the first through hole; and
   a fixing member having a second engaging portion and two stop portions;
   wherein when the connector is inserted into the fixing hole, the engaging hooks are engaged with a top surface of the support frame; when the second engaging portion of the fixing member is inserted into the first through hole, the second engaging portion is engaged with the first engaging portion and each of the stop portions is sandwiched in the deformation space correspondingly.

2. The loose-proof module of claim 1, wherein the support frame further has a first positioning portion, the fixing member further has a second positioning portion, and the second positioning portion is engaged with the first positioning portion when the second engaging portion of the fixing member is inserted into the first through hole.

3. The loose-proof module of claim 1, wherein the fixing member further has a reinforcing rib connected to the second engaging portion.

4. The loose-proof module of claim 1, wherein an extending direction of the second engaging portion is perpendicular to an extending direction of the stop portions.

5. The loose-proof module of claim 1, wherein the support frame further has a second through hole and a third engaging portion, the third engaging portion extends from the bottom surface of the support frame and is adjacent to the second through hole, the fixing member further has a fourth engaging portion, an extending direction of the fourth engaging portion is parallel to an extending direction of the second engaging portion, and the fourth engaging portion is engaged with the third engaging portion when the fourth engaging portion of the fixing member is inserted into the second through hole.

6. The loose-proof module of claim 5, wherein the first engaging portion and the third engaging portion are connected to each other integrally.

7. The loose-proof module of claim 5, wherein the second engaging portion and the fourth engaging portion face opposite directions.

8. The loose-proof module of claim 1, further comprising a connecting member connecting the support frame and the fixing member.

9. An electronic device comprising:
   a casing;
   an electronic component disposed in the casing;
   a connector having two engaging hooks, a deformation space existing between each of the engaging hooks and a side wall of the connector; and
   a loose-proof module disposed on the casing, the loose-proof module comprising a support frame and a fixing member, the support frame having a fixing hole, a first through hole and a first engaging portion, the first engaging portion extending from a bottom surface of the support frame and being adjacent to the first through hole, the fixing member having a second engaging portion and two stop portions;
   wherein when the connector is inserted into the fixing hole, the engaging hooks are engaged with a top surface of the support frame; when the second engaging portion of the fixing member is inserted into the first through hole, the second engaging portion is engaged with the first engaging portion and each of the stop portions is sandwiched in the deformation space correspondingly.

10. The electronic device of claim 9, wherein the support frame further has a first positioning portion, the fixing member further has a second positioning portion, and the second positioning portion is engaged with the first positioning portion when the second engaging portion of the fixing member is inserted into the first through hole.

11. The electronic device of claim 9, wherein the fixing member further has a reinforcing rib connected to the second engaging portion.

12. The electronic device of claim 9, wherein an extending direction of the second engaging portion is perpendicular to an extending direction of the stop portions.

13. The electronic device of claim 9, wherein the support frame further has a second through hole and a third engaging portion, the third engaging portion extends from the bottom surface of the support frame and is adjacent to the second through hole, the fixing member further has a fourth engaging portion, an extending direction of the fourth engaging portion is parallel to an extending direction of the second engaging portion, and the fourth engaging portion is engaged with the third engaging portion when the fourth engaging portion of the fixing member is inserted into the second through hole.

14. The electronic device of claim 13, wherein the first engaging portion and the third engaging portion are connected to each other integrally.

15. The electronic device of claim 13, wherein the second engaging portion and the fourth engaging portion face opposite directions.

16. The electronic device of claim 9, wherein the loose-proof module further comprises a connecting member connecting the support frame and the fixing member.

* * * * *